United States Patent
Peters

(10) Patent No.: US 7,215,745 B2
(45) Date of Patent: May 8, 2007

(54) GREETINGS AND ANNOUNCEMENTS FOR A MULTIMEDIA IP COMMUNICATION SYSTEM

(75) Inventor: Michael Peters, Downers Grove, IL (US)

(73) Assignee: Rockwell Electronic Commerce Technologies, LLC, Wood Dale, IL (US)

( * ) Notice: Subject to any disclaimer, the term of this patent is extended or adjusted under 35 U.S.C. 154(b) by 0 days.

(21) Appl. No.: 10/988,790

(22) Filed: Nov. 15, 2004

(65) Prior Publication Data

US 2006/0104425 A1    May 18, 2006

(51) Int. Cl.
*H04M 1/64* (2006.01)

(52) U.S. Cl. ............... 379/88.23; 379/88.19; 379/93.21; 370/352

(58) Field of Classification Search ......... 379/205.01, 379/207.13, 88.19, 88.23, 88.25, 93.21; 370/352, 261, 392

See application file for complete search history.

(56) References Cited

U.S. PATENT DOCUMENTS

| | | | | |
|---|---|---|---|---|
| RE34,380 E | * | 9/1993 | Sleevi | 379/88.25 |
| 5,555,179 A | | 9/1996 | Koyama et al. | |
| 5,684,872 A | | 11/1997 | Flockhart et al. | 379/266 |
| 5,696,818 A | | 12/1997 | Doremus et al. | 379/265 |
| 5,729,600 A | | 3/1998 | Blaha et al. | 379/265 |
| 5,765,033 A | | 6/1998 | Miloslavsky | |
| 5,778,053 A | * | 7/1998 | Skarbo et al. | 379/93.21 |
| 5,926,539 A | | 7/1999 | Shtivelman | |
| 5,946,387 A | | 8/1999 | Miloslavsky | |
| 5,953,332 A | | 9/1999 | Miloslavsky | |
| 5,953,405 A | | 9/1999 | Miloslavsky | |
| 6,002,760 A | | 12/1999 | Gisby | |
| 6,021,428 A | | 2/2000 | Miloslavsky | |
| 6,044,145 A | | 3/2000 | Kelly et al. | |
| 6,044,368 A | | 3/2000 | Powers | |
| 6,067,357 A | | 5/2000 | Kishinsky et al. | |
| 6,108,711 A | | 8/2000 | Beck et al. | |
| 6,138,139 A | | 10/2000 | Beck et al. | |
| 6,167,395 A | | 12/2000 | Beck et al. | |
| 6,170,011 B1 | | 1/2001 | Beck et al. | |
| 6,175,563 B1 | | 1/2001 | Miloslavsky | |
| 6,175,564 B1 | | 1/2001 | Miloslavsky et al. | |
| 6,185,292 B1 | | 2/2001 | Miloslavsky | |
| 6,295,354 B1 | | 9/2001 | Dezonno | 379/266 |
| 6,345,305 B1 | | 2/2002 | Beck et al. | |
| 6,373,836 B1 | | 4/2002 | Deryugin et al. | |
| 6,389,007 B1 | | 5/2002 | Shenkman et al. | |

(Continued)

FOREIGN PATENT DOCUMENTS

EP    0884885    12/1998

(Continued)

*Primary Examiner*—Gerald Gauthier
(74) *Attorney, Agent, or Firm*—Welsh & Katz, Ltd.

(57) ABSTRACT

The method and system for presenting a predetermined announcement or greeting to a calling party attempting to reach a called party within a Multimedia IP Communication System comprising the steps of or software or circuitry for: determining an announcement or greeting based on a variety of parameters, other than DTMF and ANI/DNIS, related to a call or caller; storing the announcement or greeting in a repository of announcements or greetings; identifying an incoming call or caller; selecting the predetermined announcement or greeting for that call or caller; playing the announcement or greeting to the calling party; and advising the called party of the incoming call.

20 Claims, 1 Drawing Sheet

U.S. PATENT DOCUMENTS

Figure 1:
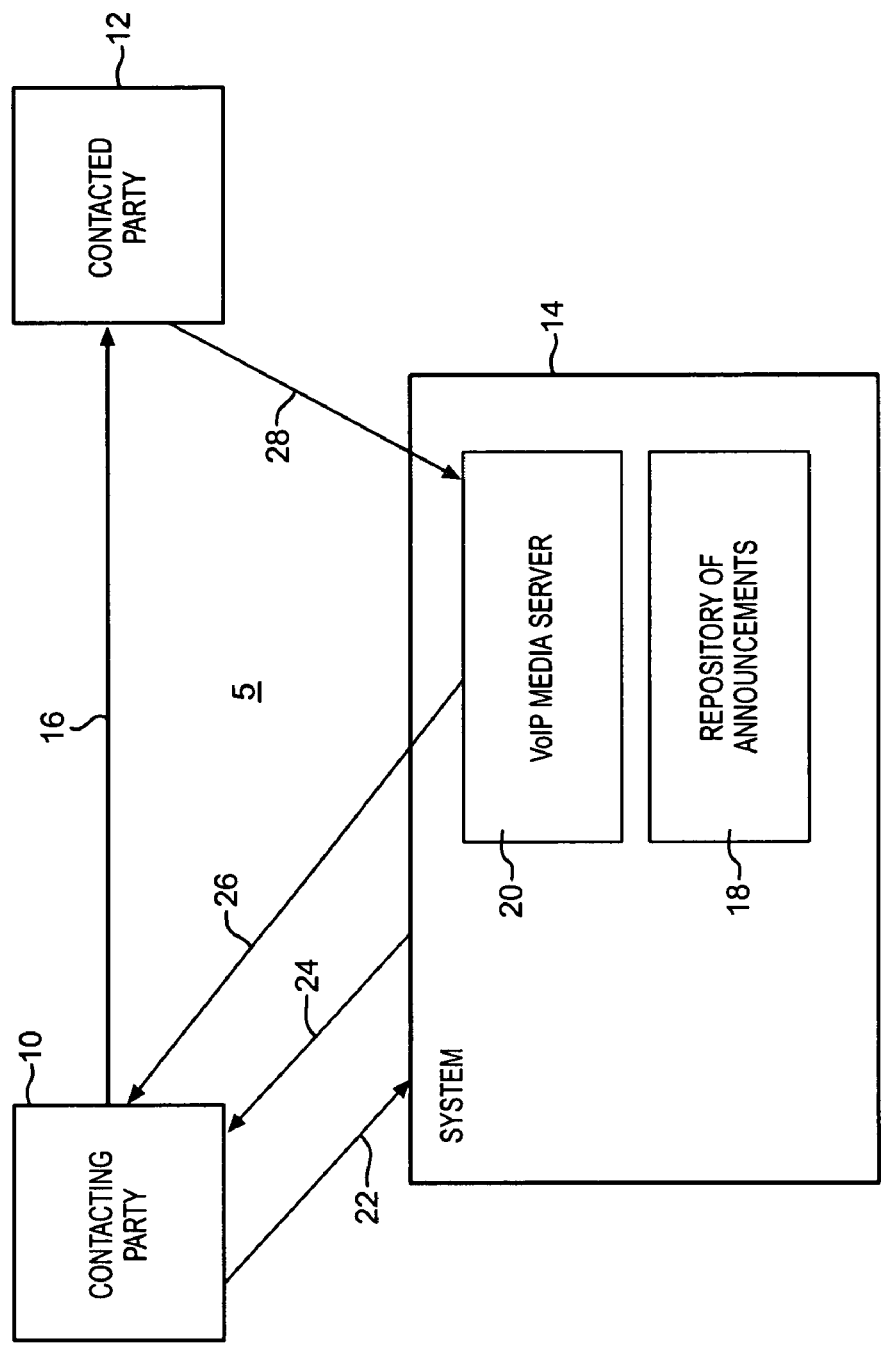

| | | |
|---|---|---|
| 6,393,015 B1 | 5/2002 | Shtivelman |
| 6,411,687 B1 | 6/2002 | Bohacek et al. ......... 379/88.21 |
| 6,459,776 B1 | 10/2002 | Aktas et al. |
| 6,522,743 B1 | 2/2003 | Hurd ..................... 279/266.04 |
| 6,546,097 B1 | 4/2003 | Peltz ..................... 279/265.07 |
| 6,661,882 B1 | 12/2003 | Muir et al. ............ 379/127.01 |
| 6,732,156 B2 | 5/2004 | Miloslavsky |
| 6,826,173 B1 * | 11/2004 | Kung et al. .................. 370/352 |
| 2003/0118173 A1 | 6/2003 | Bluestein et al. |

FOREIGN PATENT DOCUMENTS

| | | |
|---|---|---|
| WO | WO 2001/74035 | 10/2001 |
| WO | WO 2002/054743 | 7/2002 |

* cited by examiner

GREETINGS AND ANNOUNCEMENTS FOR A MULTIMEDIA IP COMMUNICATION SYSTEM

BACKGROUND

1. Field of the Invention

The present invention relates generally to communication systems and more particularly to a method and system for developing announcements or greetings in a call center environment based on a number of different parameters, and correlating the different greetings or announcements with different contacting parties.

2. Description of the Related Art

One prior method and system provides for determining call attempts and giving to the call one of a plurality of different treatments such as where in a queue the call is placed. Another method and system issues a delay message based on information in the call. A further method and system provide an automated call servicing system including a voice response unit with a plurality of stored scripts for servicing types of calls from customers automatically in response to call identification signals, e. g. , DTMF (a Dual Tone Multi-Frequency signal) and ANI (Automatic Number Identification)/DNIS (Dialed Number Identification Service), corresponding to the different types of calls associated with the different stored scripts of the voice response unit. Another method and system alters the call wait time based on an average call wait time. A still further method and system analyses information elicited from a caller and identifies callers having certain behavioral characteristics for routing those callers to specific agents. Additionally, another prior method and system identifies a customer placing a call utilizing a caller identification feature, retrieves from a data base customer profile information associated with the identified customer, and selects one of the call centers in response to the customer profile information and to information on the call center. Additionally, a further method and system imbeds information about an incoming call in an Automatic Number Identification field, so that the information is available at the agent's desktop, regardless of where the call is transferred by the system.

BRIEF SUMMARY

According to one embodiment of the present invention a method is provided for presenting a predetermined announcement or greeting to a calling party attempting to reach a called party within a Multimedia IP Communication System comprising the steps of: determining an announcement or greeting based on a variety of parameters, other than DTMF and ANI/DNIS, related to a call or caller; storing the announcement or greeting in a repository of announcements or greetings; identifying an incoming call or caller; selecting the predetermined announcement or greeting for that call or caller; playing the announcement or greeting to the calling party; and advising the called party of the incoming call.

Further according to another embodiment of the invention there is provided a system for presenting a predetermined announcement or greeting to a calling party attempting to reach a called party within a Multimedia IP Communication System comprising: software for determining an announcement or greeting based on a variety of parameters, other than DTMF and ANI/DNIS, related to a call or caller; a memory repository for storing the announcements or greetings; software for identifying an incoming call or caller; software for selecting the predetermined announcement or greeting for that call or caller; software and circuitry for playing the announcement or greeting to the calling party; and, software and circuitry for advising the called party of the incoming call.

BRIEF DESCRIPTION OF THE FIGURE OF THE DRAWINGS

The invention, together with the advantages thereof, may be understood by reference to the following description in conjunction with the accompanying figure, which illustrate one embodiment of the invention.

FIG. 1 of the drawing is a block diagram illustrating one example of the use of a selected greeting or announcement retrieved from a repository of announcements in a Multimedia IP Communication System as directed by instructions from a Contacted Party for presentation to a Contacting Party, contacting the system.

DETAILED DESCRIPTION

While the present invention is susceptible of embodiments in various forms, there is shown in the drawing and will hereinafter be described some exemplary and non-limiting embodiment(s), with the understanding that the present disclosure is to be considered an exemplification of the invention and is not intended to limit the invention to the specific embodiment(s) illustrated. In this disclosure, the use of the disjunctive is intended to include the conjunctive. The use of the definite article or indefinite article is not intended to indicate cardinality. In particular, a reference to "the" object or "a" object is intended to denote also one of a possible plurality of such objects.

FIG. 1 illustrates one example of a system 5 for presenting a predetermined and correlated announcement or greeting to a calling party 10. The calling party (Contacting Party) 10, attempting to reach a called party (Contacted Party) 12 within a Multimedia IP Communication System 14, should be properly greeted. Further, this greeting should make the most of the capabilities of the Contacting Party's equipment. For example, if the Contacting Party handles both voice and video, the system could play a video greeting using the Contacted Party's voice and image.

The Contacting Party may be using one of a wide variety of protocols when attempting to call the Contacted Party, such as Session Initiated Protocol (SIP). Referring to the example of FIG. 1. , when a SIP contact enters the domain of the Multimedia IP Communication System 14, the capabilities of the Contacting Party 10 may be analyzed to determine media exchange capabilities. When a connection, (represented by line 16 in FIG. 1), is ultimately made to the Contacted Party 12, the system 14 will match the capabilities with a set of greetings or announcements the Contacted Party 12 has chosen to present to those contacting him/her. The selected greeting(s) or announcement(s) may be retrieved from a repository 18 of announcements. Criteria such as the identity of the caller, the time of day and the telephone number from which the call is made can be used to make the selection.

The structure, circuitry or software for creating and storing the announcement or greeting clips can be accomplished through existing system utilities based on the operating system. An administrative interface will allow parameterization of the selection process.

From the perspective of the Contacted Party, this will provide means of: 1. Automating the greeting of all Contacting Parties; and, 2. Personalizing by providing different greeting based on the identity of the Contacting Party. At any time during the session, the system or the Contacted Party may invoke additional announcements appropriate to the capabilities of the Contacting Party's equipment.

Finally, existing mechanisms can be used to play the greetings and announcements. The system 14 leverages existing mechanisms that are SIP standards based. There is no limit to the number of greetings and/or announcements that can be stored in the repository 18.

As illustrated in FIG. 1, the Contacting Party 10, may make contact with a Multimedia IP Communication System 14, which has a repository of announcements 18, and a VOIP (Voice Over Internet Protocol) media server 20. The Contacting Party 10 offers a contact (represented by line 22 in the figure) to the system 14, and the system 14 accepts the contact (represented by line 24 in the figure). The system 14 is programmed to deliver media content in any form to the Contacting Party 10, using IP based media services from the media server 20. The system 14 determines the identity of a Contacting Party 10 and delivers this identity on line 16 to the Contacted Party 12.

The Contacted Party then instructs the media server 20 (represented by line 26 in the figure) to deliver individualized media content in any form to the Contacting Party 10, using IP media services from the media server 20 (represented by line 28 in the figure). The announcement or greeting retrieved from the repository 18 of announcements and greetings is delivered to the Contacting Party/caller 10.

The retrieved announcement or greeting is determined by a variety of parameters such as for example, the name of the party, the time of day, business rules, the caller's telephone number or the caller's physical device being used to make the call. Callers may be identified based on material such as the physical device they are using to make the call. Further, any identifier that can be passed in the initial call setup or gathered by the system during the course of the contact (such as account number collected by an IVR (Interactive Voice Response) or an identifier of the party or device they are trying to reach, the time of day or the business rules to be applied). Additionally the identifier can be chat, IM (Instant Message), VoIP, video, email etc. Note that any location, addressing, or other user information that can be gleaned from the device the caller is using to make the call can be used.

Another identifier can be the geographic location of the call if provided by the calling device or some location service (for example, assume that the system can tell that the caller is calling from Union Station). Then, the system 14 can, while the call is placed on hold, play a promo for a restaurant in that neighborhood, etc.

Specific embodiments of novel methods and systems for providing greetings or announcements have been described for exemplification of the invention and are not intended to limit the invention to the specific embodiments illustrated. Numerous modifications and variations can be effectuated without deporting from the scope of the novel concepts of the invention. It is to be understood that no limitation with respect to the specific embodiment illustrated is intended or should be inferred. Accordingly, it is contemplated to cover by the appended claims any and all embodiments, modification, variations or equivalents that fall within the scope of the invention disclosed and claimed herein.

I claim:

1. A method in a Multimedia IP Communication System for presenting an announcement or greeting to a calling party attempting to reach a called party comprising the steps of:

analyzing media exchange capabilities of the calling party;

determining announcement or greeting based on a variety of parameters, related to a call or caller and based upon the media exchange capabilities of the calling party to create a custom announcement for that call or caller;

storing the custom announcement or greeting in a repository of announcements or greetings;

identifying an incoming call or caller;

selecting the custom announcement or greeting for that call or caller;

playing the selected custom announcement or greeting to the calling party; and advising the called party of the incoming call.

2. The method of claim 1 wherein the variety of parameters include at least one of: an identity of the caller, a time of day, business rules, the caller's telephone number, a location of the caller, a caller's physical device being used to make the call, IVR (Interactive Voice Response), chat, IM (Instant Message), VoIP, video, email or any location, addressing, or other user information that can be gleaned from the device the caller is using to make the call.

3. The method of claim 1 wherein the variety of parameters related to the call or caller also includes at least one of DTMF, ANI, and DNIS.

4. The method of claim 1 wherein one of the parameters is a location of the caller and the method includes a step of playing to the caller a promotion for a business near that location while the call is on hold.

5. The method of claim 1 wherein a media server delivers individualized content of any form to the calling party before the greeting or announcement is played to the calling party.

6. The method of claim 1 wherein a media server delivers individualized content of any form to the calling party after the greeting or announcement is played to the calling party.

7. The method of claim 1 wherein the calling party utilizes a SIP protocol and the Communications System utilizes SIP mechanisms to determine and play the announcements.

8. A Multimedia IP Communications system for presenting a predetermined announcement or greeting to a calling party attempting to reach a called party comprising:

software to analyze media exchange capabilities of the calling party;

software for determining a custom announcement or greeting for the calling party based on a variety of parameters, related to a call or caller and based on the media exchange capabilities of the calling party;

a memory repository for storing the custom announcements or greetings;

software for identifying an incoming call or caller;

software for selecting the custom announcement or greeting for that call or caller;

software and circuitry for playing the selected custom announcement or greeting to the calling party; and, software and circuitry for advising the called party of the incoming call.

9. The system of claim 8 wherein the variety of parameters include at least one of: an identity of the caller, a time of day, business rules, the caller's telephone number, a location of the caller, a caller's physical device being used to make the call, IVR (Interactive Voice Response), chat, IM (Instant Message), VoIP, video, email or any location, addressing, or other user information that can be gleaned from the device the caller is using to make the call.

10. The system of claim 8 wherein the variety of parameters related to the call or caller also includes at least one of DTMF, ANI, and DNIS.

11. The system of claim 8 wherein one of the parameters is a location of the caller and the system is operable to play to the caller a promotion for a business near that location while the call is on hold.

12. The system claim 8 wherein a media server delivers individualized content of any form to the calling party before the greeting or announcement is played to the calling party.

13. The system of claim 8 wherein a media server delivers individualized content of any form to the calling party after the greeting or announcement is played to the calling party.

14. The system of claim 8 wherein the calling party utilizes a SIP protocol and the Communications System utilizes SIP mechanisms to determine and play the announcements.

15. An apparatus within a Multimedia IP Communications System for presenting a predetermined announcement or greeting to a calling party attempting to reach a called party comprising:
   means for analyzing media exchange capabilities of the calling party;
   means for determining an announcement or greeting based on a variety of parameters, in addition to DTMF, ANI, and DNIS, related to a call or caller and based on the media exchange capabilities of the calling party to create a custom announcement for that call or caller;
   means for storing the custom announcements or greetings;
   means for identifying an incoming call or caller;
   means for selecting the custom announcement or greeting for that call or caller;
   means for playing the select custom announcement or greeting to the calling party; and,
   means for advising the called party of the incoming call.

16. The apparatus of claim 15 wherein the variety of parameters include at least one of: an identity of the caller, a time of day, business rules, a caller's telephone number, a location of the caller, a caller's physical device being used to make the call, IVR (Interactive Voice Response), chat, IM (Instant Message), VoIP, video, email or any location, addressing, or other user information that can be gleaned from the device the caller is using to make the call.

17. The apparatus of claim 15 wherein the variety of parameters related to the call or caller also includes at least one of DTMF, ANI, and DNIS.

18. The apparatus of claim 15 wherein one of the parameters is a location of the caller and the apparatus is operable to play to the caller a promotion for a business near that location while the call is on hold.

19. The apparatus claim 15 including a means for delivering individualized content of any form to the calling party before the greeting or announcement is played to the calling party.

20. The apparatus of claim 15 including means for delivering individualized content of any form to the calling party after the greeting or announcement is played to the calling party.

* * * * *